Oct. 31, 1967  R. A. VAN DER LAKEN  3,350,273
PRESSURE PIPE NUCLEAR REACTOR WITH INSULATING AND
PRESTRESSING ARRANGEMENT OF
COAXIAL PIPE ASSEMBLY

Filed March 2, 1965

INVENTOR.
ROBERT A. VAN DER LAKEN
BY
Cushman, Darby & Cushman

Oct. 31, 1967     R. A. VAN DER LAKEN     3,350,273
PRESSURE PIPE NUCLEAR REACTOR WITH INSULATING AND
PRESTRESSING ARRANGEMENT OF
COAXIAL PIPE ASSEMBLY
Filed March 2, 1965     2 Sheets-Sheet 2
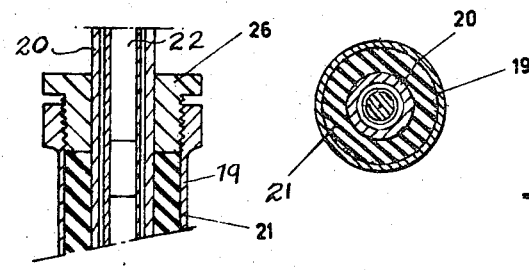
FIG. 3
FIG. 4
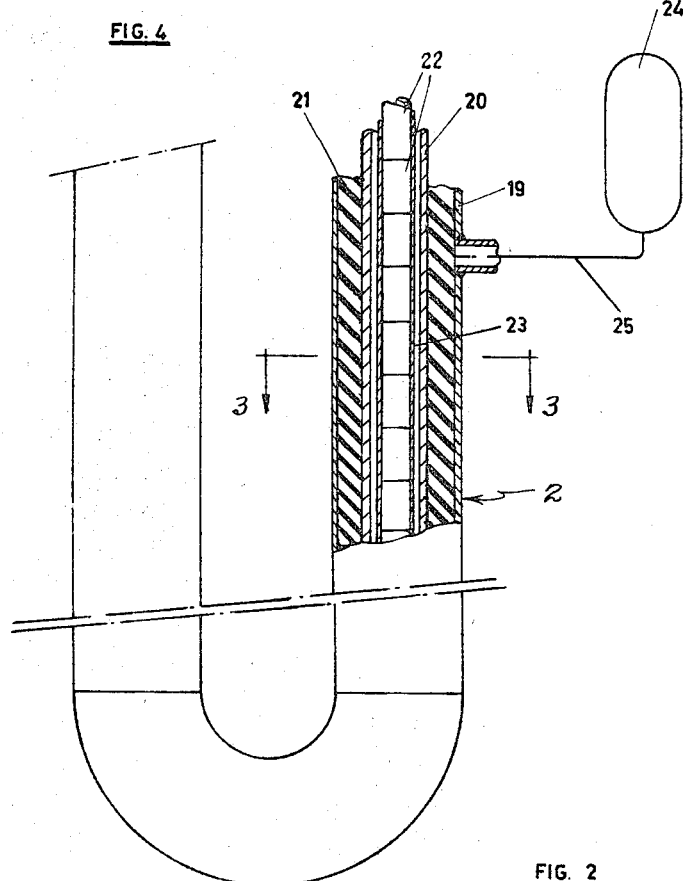
FIG. 2
INVENTOR.
ROBERT A. VAN DER LAKEN
BY
Cushman, Darby & Cushman
ATTORNEYS

# United States Patent Office 3,350,273
Patented Oct. 31, 1967

3,350,273
PRESSURE PIPE NUCLEAR REACTOR WITH INSULATING AND PRESTRESSING ARRANGEMENT OF COAXIAL PIPE ASSEMBLY
Robert A. van der Laken, The Hague, Netherlands, assignor to Reactor Centrum Nederland (Stichting), The Hague, Netherlands
Filed Mar. 2, 1965, Ser. No. 436,446
Claims priority, application Netherlands, Mar. 2, 1964, 64—2,508
4 Claims. (Cl. 176—43)

This application relates to a pressure pipe reactor in which fissile substances are mounted inside one or more pressure pipes which in turn are surrounded by a plurality of shell pipes. In such an arrangement the fissile substances are cooled by a primary coolant which moves forward through each pressure pipe, while each shell pipe is cooled by a mass of a cooling moderator outside these pipes, which mass is preferably composed of heavy water.

Pressure pipe reactors of this kind which are known in prior art must handle a very high temperature gradient across the space between a pressure pipe and a shell pipe, this space usually being filled with primary coolant. As a result undesirable thermal stresses are often produced in the pipe walls. Furthermore, each pressure pipe not only must handle a high internal overpressure but is also at the same time exposed to a very high temperature as a result of heat developed by the nuclear fuel therein. Surrounding the shell pipe of each pressure pipe is the comparatively cool moderator material for which heavy water is generally used. Consequently, the shell pipe is not heavily loaded, as there are only small forces acting upon it, at a comparatively low temperature. In comparison with this, the load on each pressure pipe is very unfavorable, because in this case a high load is accompanied by a high temperature.

In order to counteract this unequal loading of the pressure and shell pipe, it is proposed according to the invention to enclose a compact layer of insulating material on all sides in the space between each pressure pipe and shell pipe.

Two advantages are now obtained:

Firstly, owing to the insulation positioned between the pressure pipe and the shell pipe, the temperature gradient over these pipes is considerably reduced, so that the occurrence of undesirable thermal stresses is to a large extent counteracted.

Secondly, it is possible to transfer a large part of the pressure pipe load through the insulation mass to the shell pipe during operation of the reactor.

The insulating material to be introduced between the shell pipe and the pressure pipe is preferably made of graphite, which may be in granular or powdered form.

The invention will be further understood from the following detailed description taken with the drawings in which:

FIGURE 2 is a fragmentary elevational view, on an enlarged scale and partly broken away, of a pressure pipe and associated shell pipe arranged according to the principles of the present invention;

FIGURE 3 is a horizontal cross-sectional view taken on the line 3—3 of FIGURE 2; and FIGURE 4 is a fragmentary view illustrating a modified form of the invention in which a screw cover is fitted to the end of the insulation.

Figure 1:
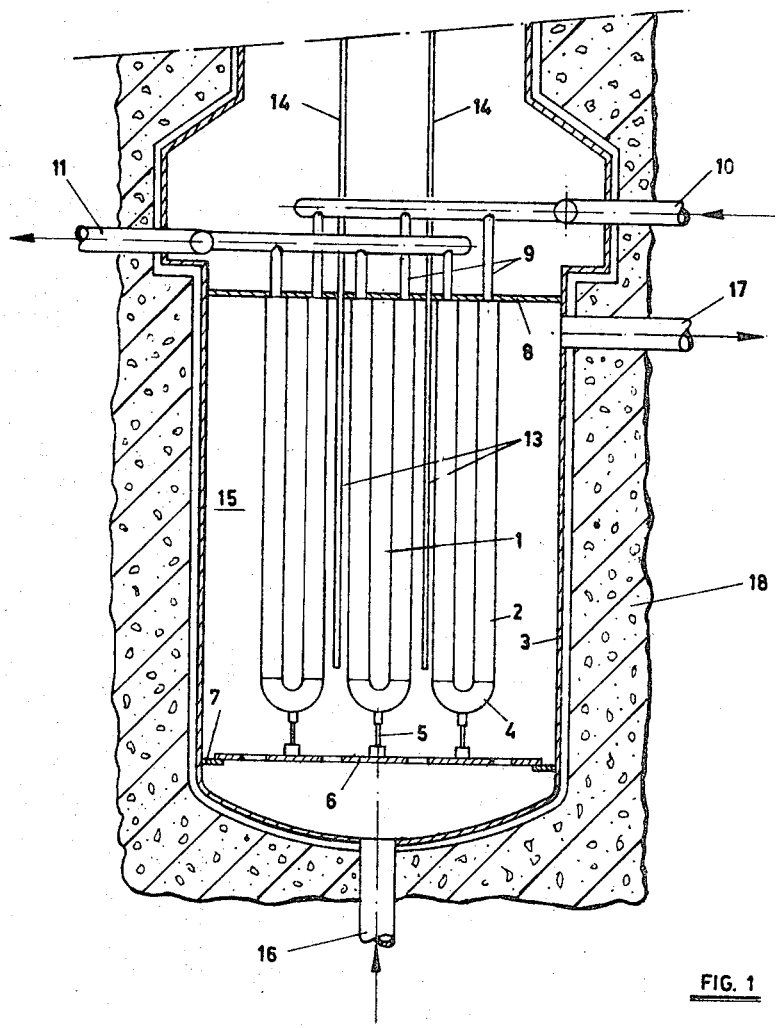
FIGURE 1 is a vertical cross-sectional view through a pressure pipe reactor.

In FIGURE 1 there is shown a reactor vessel 3 having a core 1 which includes a plurality of U-shaped shell-pipe assemblies 2 having inside them pressure pipes which are filled with fissile material. On the underside of the curved pipe assemblies 2 there are bends 4 which are supported by supporting members 5 which in turn are mounted on a supporting plate 6 provided with apertures. The plate 6 is joined at its circumference to a ring 7 fixed to the inner wall of the reactor vessel 3. The upper end of the reactor vessel 3 is closed by a cover 8 through which pass a plurality of connections 9. The latter are in communication with feed and discharge conduits 10 and 11, respectively, for the primary coolant. Item 13 denotes control rods which can be pulled up via manipulating rods 14 from the reactor core in order to control the neutron flux in the reactor core. The entire assembly of pipe assemblies 2 is mounted in a liquid moderator mass 15 which completely fills the reactor space between the plate 6 and the cover 8. Moderator is fed to the underside of the core through a feed conduit 16 and is discharged from the upper end of the reactor vessel through a conduit 17. Finally, the whole reactor is mounted inside a casing 18 which may be composed for instance of concrete or baryta concrete, for protection of personnel from biologically harmful radiation.

Referring to FIGURE 2 it will be seen that each pipe assembly 2 includes an outer shell pipe 19, an inner pressure pipe 20 and an annular insulating mass between the two. Mounted inside the pressure pipe 20 are fissile tablets 22 which are protected on the outer side by a sheathing 23. In the interest of simplicity the mounting means for the latter is not shown in the drawing.

The moderating mass 15 which is situated in the reactor vessel 3 and which washes around the pipe assemblies 2 on all sides has a comparatively low temperature and consequently, in a case where heavy water is employed, a comparatively low pressure. The reactor vessel 3 need not therefore take great stresses. The primary coolant, however, which flows through the interior of the pressure pipes 20 is subjected both to a high temperature and to a high pressure. Consequently, there is exerted upon the inner surface of the pressure pipes 20 a high internal pressure which is, however, propagated through the compact insulating material 21, thereby also loading the shell pipes 19. The most favorable case occurs when, by suitably selected dimensions, one succeeds in restricting the tangential stresses to the shell pipes 19 combined with pressure stresses in the insulation mass 21. In the latter case each pressure pipe is thus relieved as regards tangential stresses. These pipes then only propagate compressive stresses by transmitting them to the insulating mass 21. The requirement for this, however, is that the reactor pipes shall be so constructed and mounted that with the reactor on zero load and coolant, the pressure pipes are subjected to a tangential pressure stress. This can be achieved by placing the insulating mass 21 under pressure in the spaces existing between each shell pipe and pressure pipe. The result of this is that even when the reactor is cold there is already a tangential tensile stress in the shell pipes 19. When the reactor is heated up and the primary coolant is placed under pressure, there will ultimately be such a state of stress that the pressure pipes are relieved as regards tangential stresses, whereas on the contrary the shell pipes take an increased tangential load in comparison with the cold state of the reactor. However, these shell pipes are well able to stand the higher tangenital tensile stress, as they are excellently cooled by the cold moderator mass with which they are in direct contact.

The operation of placing the positioned insulating material under pressure when the reactor is cold may be effected in different ways. As seen in FIGURE 2 the prestress is obtained by subjecting the spaces in which the insulating material 21 is placed to fluid pressure by means of a special fluid pressure generator 24 to which these spaces are connected by means of conduits 25. It is, of course, necessary that the ends of the spaces be tightly closed to prevent escape of the pressurized fluid. This arrangement offers the advantage that the prestress can at any time be adapted to modified reactor conditions. Also, when the temperature and pressure of the primary coolant vary, it is possible to maintain the advantage of having a pressure pipe free from tensile stress.

As seen in FIGURE 4 the insulating material 21 is subjected to a mechanical prestress by screwing a threaded ring-shaped closure cover 26 between each shell pipe 19 and pressure pipe 20 to such a degree of tightness that the desired prestress is obtained.

With both prestress arrangements the required prestress is determined by calculation or experimentally.

What is claimed is:

1. A nuclear reactor of the pressure pipe type comprising: a reactor vessel; a mass of relatively cool liquid neutron moderator material disposed in said vessel; a plurality of pipe assemblies extending through said moderator, each of said assemblies including a pressure pipe containing fissile material fixed in spaced relationship to the inner surface thereof, a coaxial shell pipe surrounding said pressure pipe and defining therewith a fluid tight space having closed ends; and means for circulating a high pressure, high temperature fluid coolant through the inside of said pressure pipes; and means for propagating an appreciable portion of the internal pressure in each of said pressure pipes to the respective shell pipe so as to relieve stresses in said pressure pipe and increase stresses in said shell pipe whereby said latter stresses are resisted by relatively cool pipe walls and whereby the relatively hot walls of said pressure pipe resist reduced stresses, said means including a mass of solid thermally insulating material in contact with the outer wall of said pressure pipe and with the inner wall of said shell pipe, said means further including pressurizing means associated with said thermally insulating material and for urging the same against the walls of said pressure pipe and said shell pipe under high pressure.

2. A reactor as in claim 1 wherein said insulating material is graphite.

3. A reactor as in claim 2 wherein said graphite is in particulate form.

4. A reactor as in claim 1 wherein said pressurizing means includes a threaded ring-shaped cover closing one end of said space and engaging said insulating material whereby rotation of said cover varies the compacting pressure on said insulating material.

References Cited

UNITED STATES PATENTS

| | | | |
|---|---|---|---|
| 1,860,203 | 5/1932 | Rishel | 138—149 |
| 2,348,754 | 5/1944 | Ray | 165—135 |
| 2,498,924 | 2/1950 | Keller | 165—136 |
| 2,868,708 | 1/1959 | Vernon | 176—43 |
| 3,071,527 | 1/1963 | Young | 176—52 |
| 3,099,616 | 7/1963 | Baver et al. | 176—52 |

FOREIGN PATENTS 754,183    8/1956    Great Britain.

L. DEWAYNE RUTLEDGE, *Primary Examiner.*

CARL D. QUARFORTH, *Examiner.*